W. E. THOMPSON & W. A. LOCKHART.
SWAGING MACHINE.
APPLICATION FILED MAR. 5, 1913.
1,099,523.
Patented June 9, 1914.
12 SHEETS—SHEET 2.
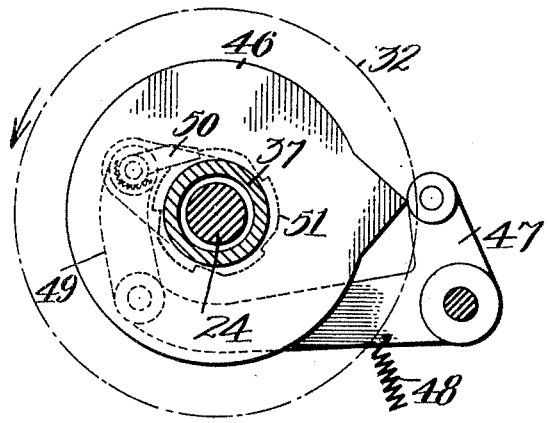
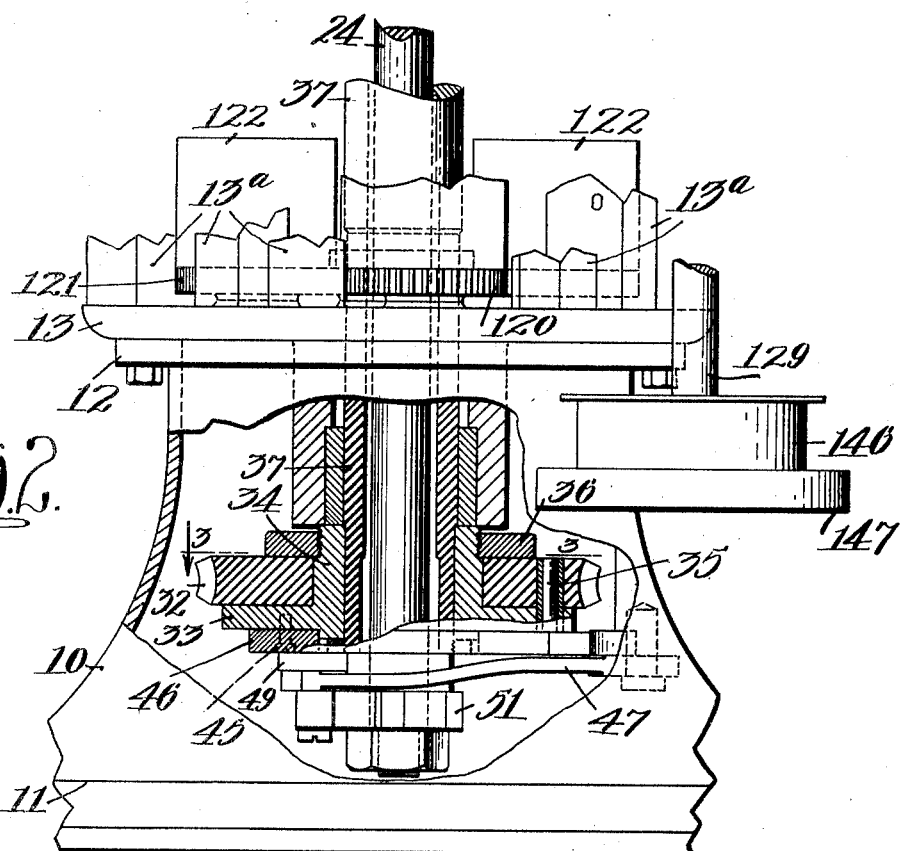

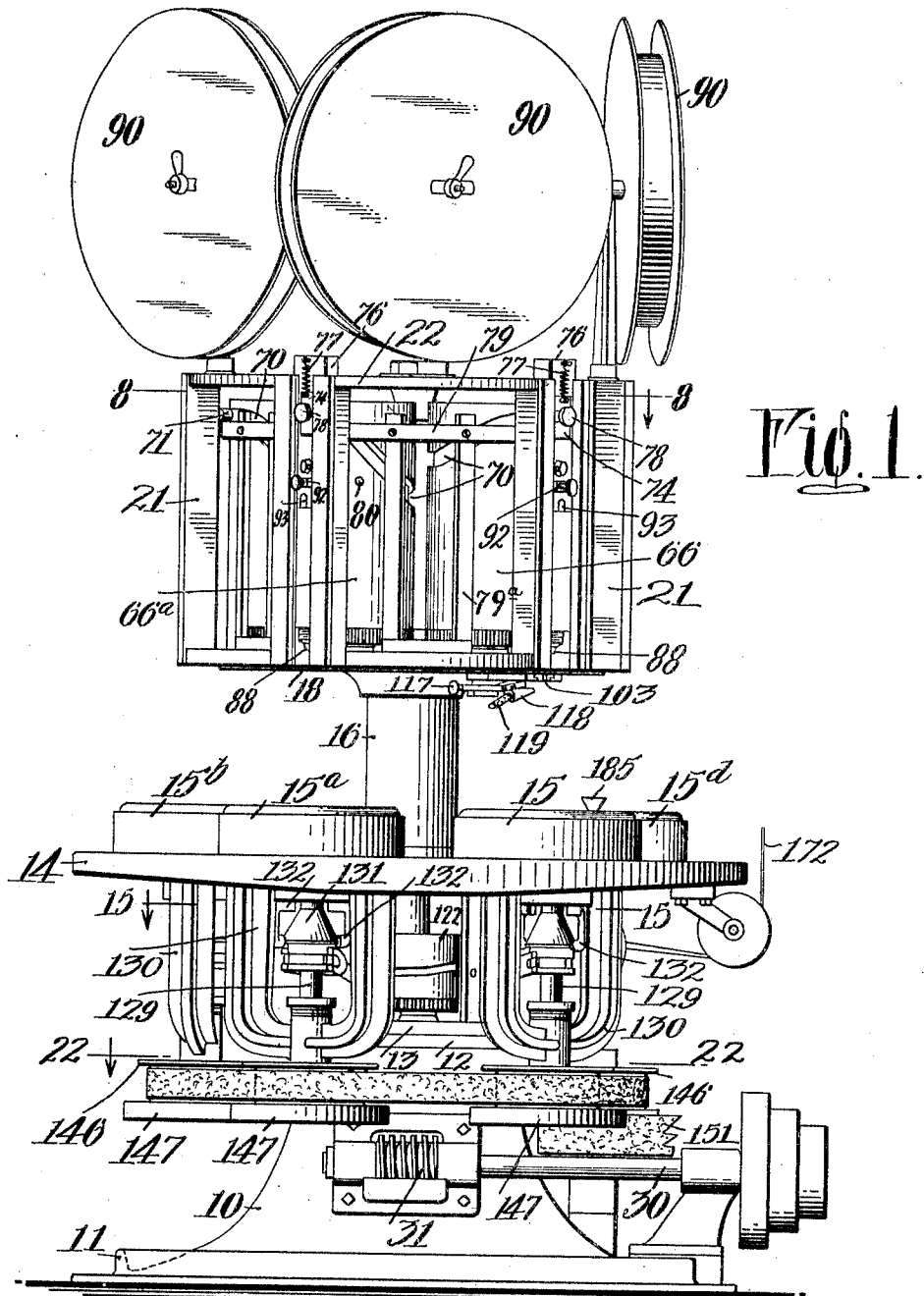

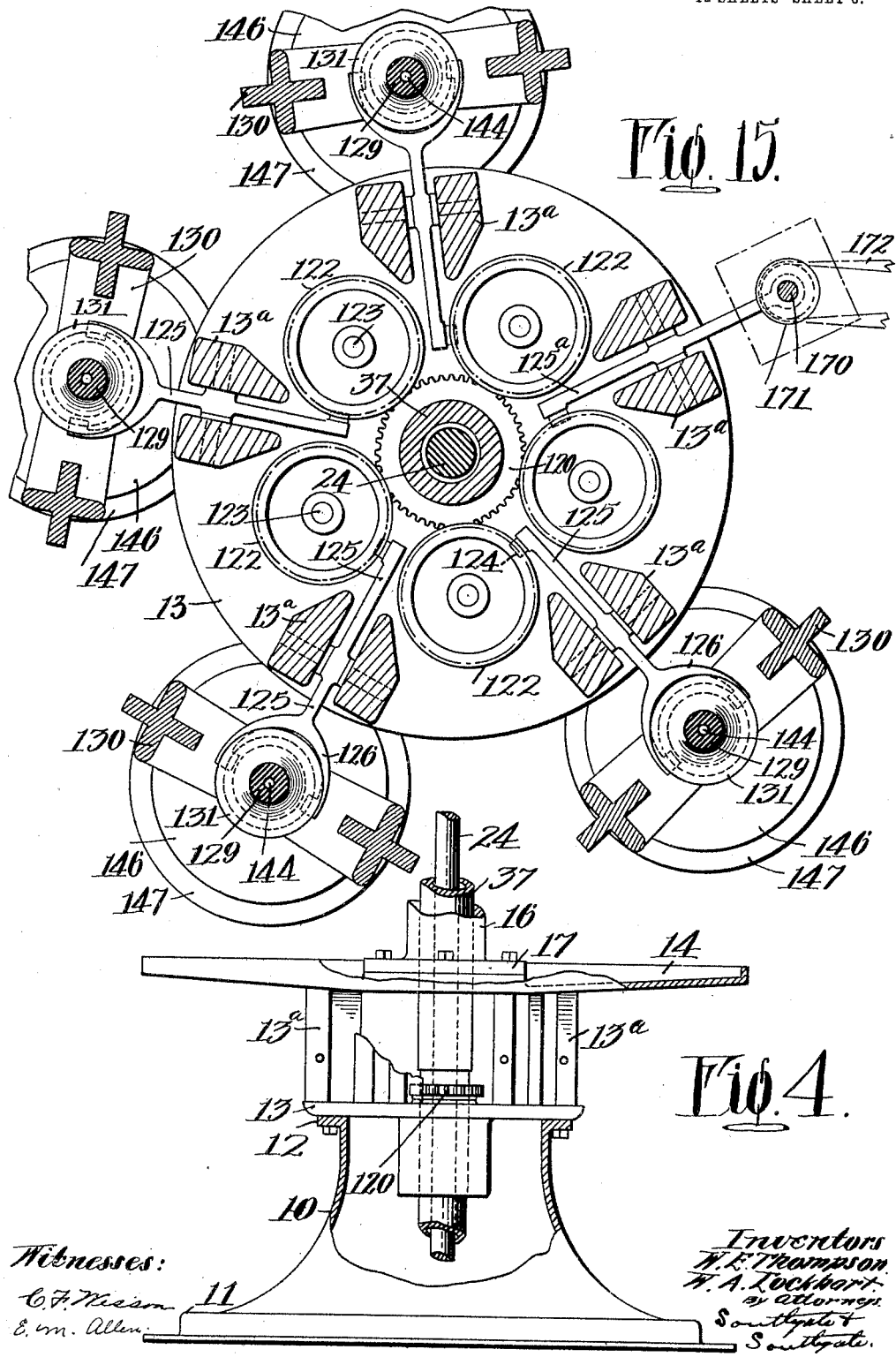

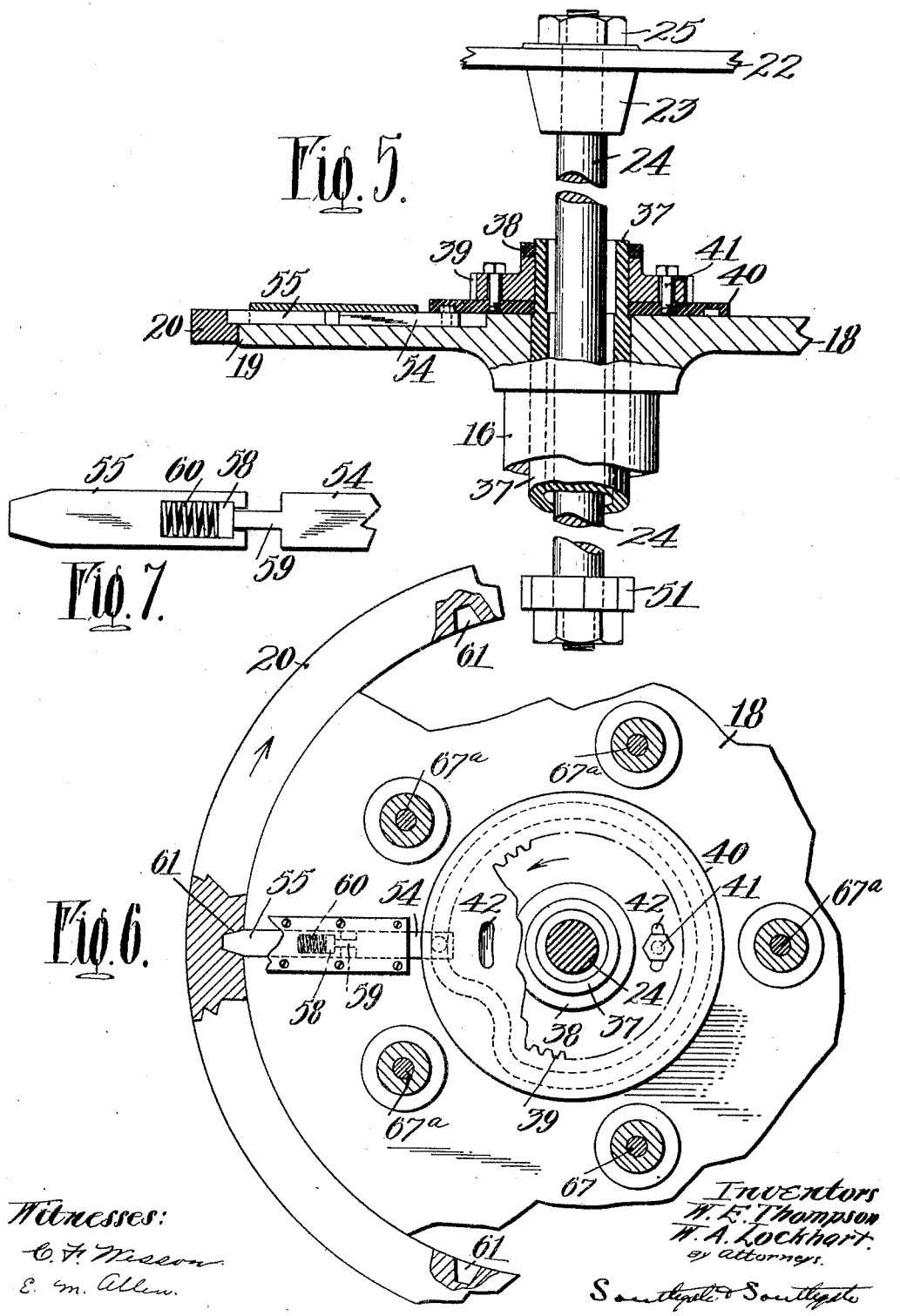

W. E. THOMPSON & W. A. LOCKHART.
SWAGING MACHINE.
APPLICATION FILED MAR. 5, 1913.
1,099,523.
Patented June 9, 1914.
12 SHEETS—SHEET 5.
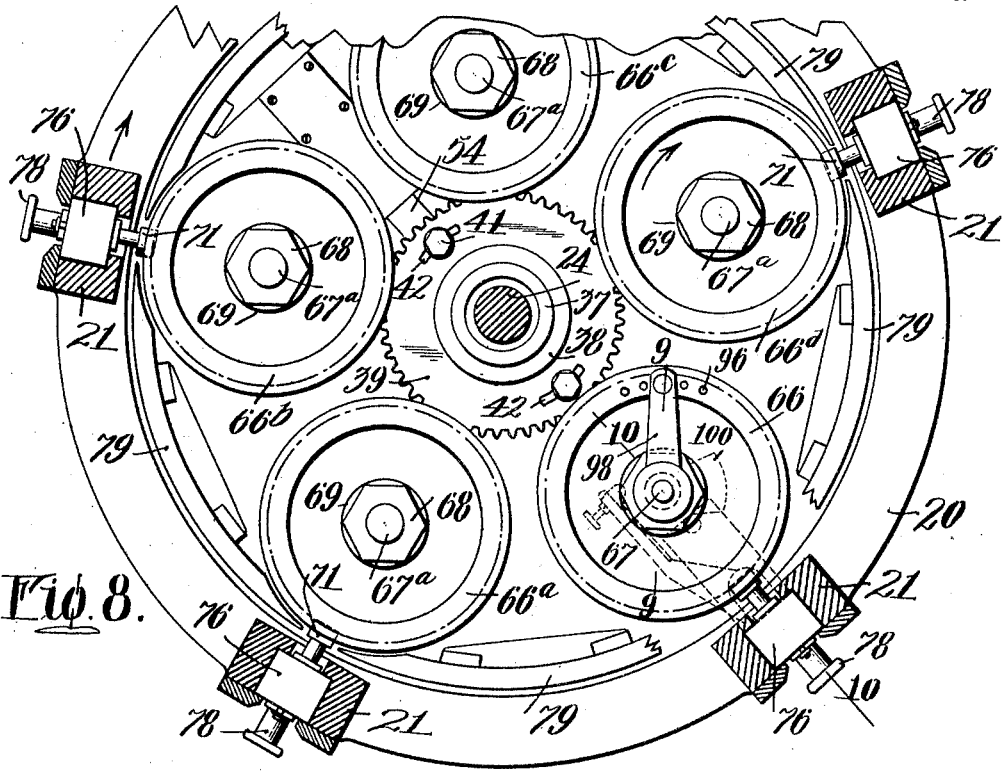
Fig. 8.
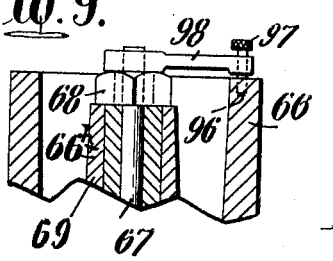
Fig. 9.
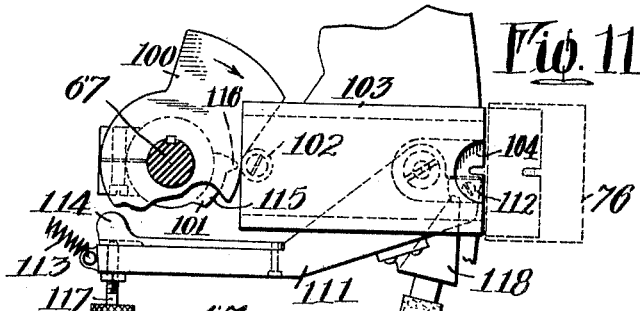
Fig. 11.
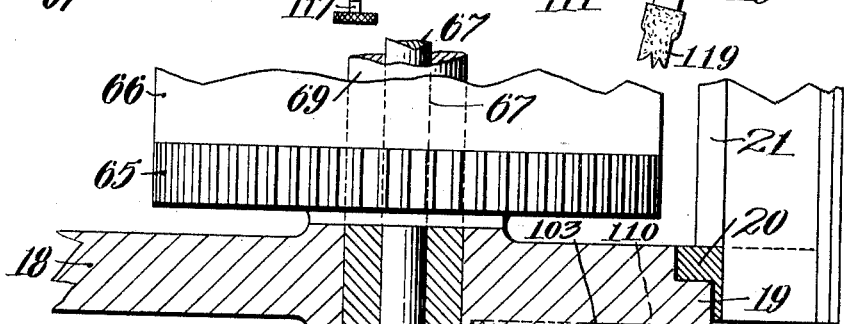
Fig. 10.
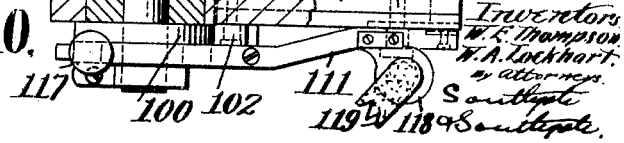

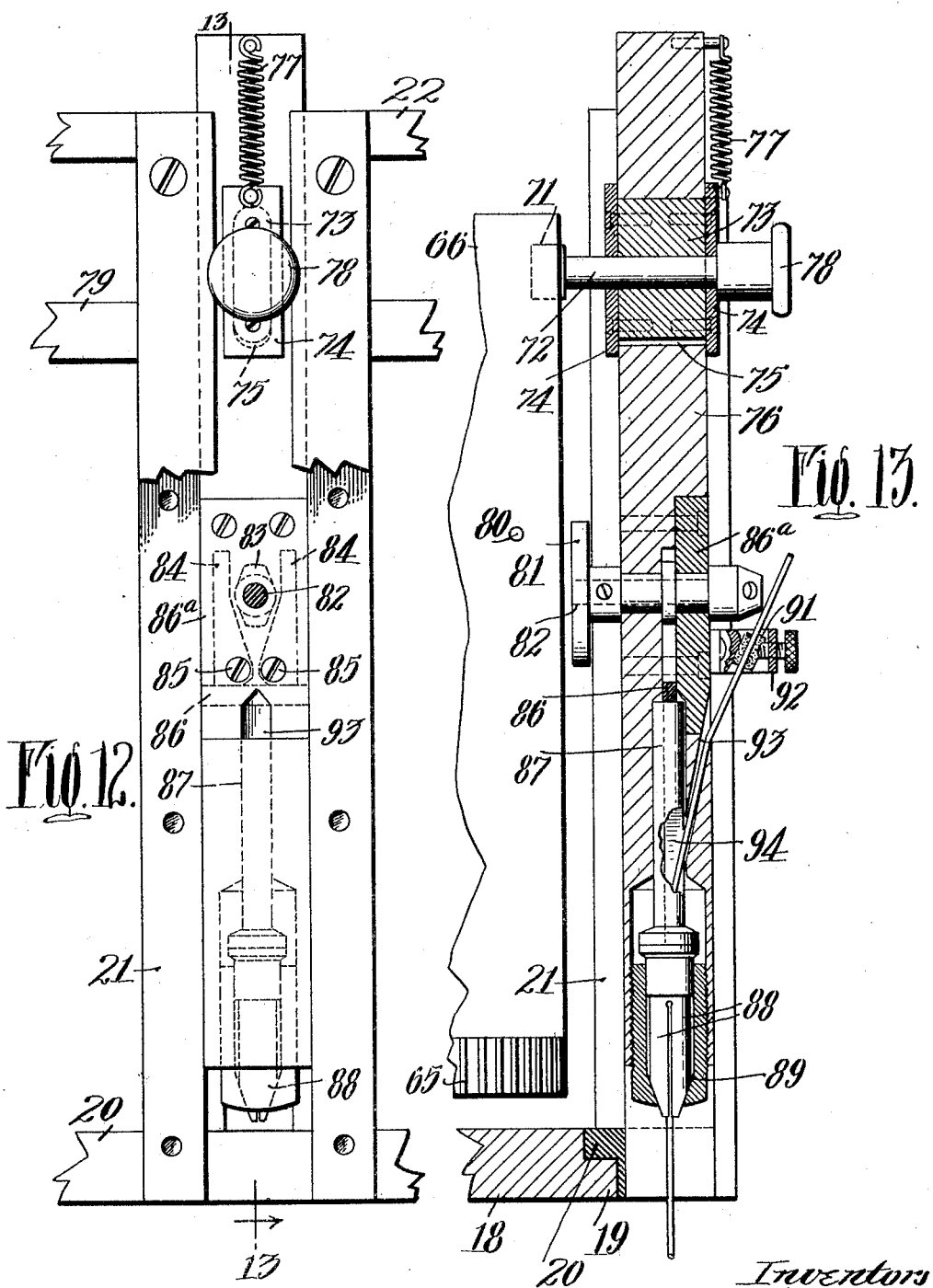

W. E. THOMPSON & W. A. LOCKHART.
SWAGING MACHINE.
APPLICATION FILED MAR. 5, 1913.
1,099,523.
Patented June 9, 1914.
12 SHEETS—SHEET 7.
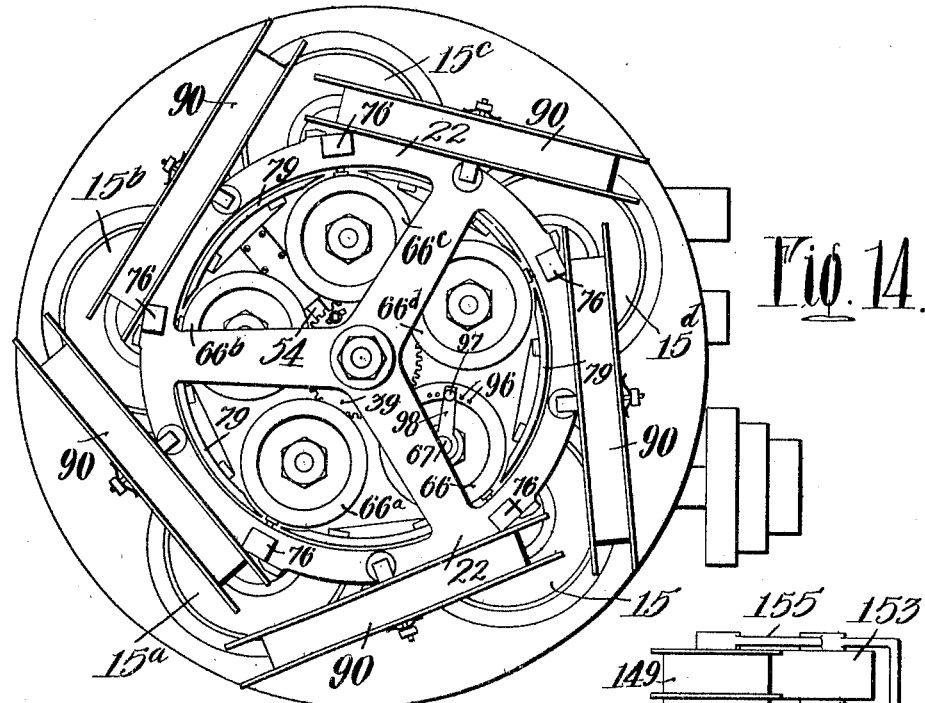
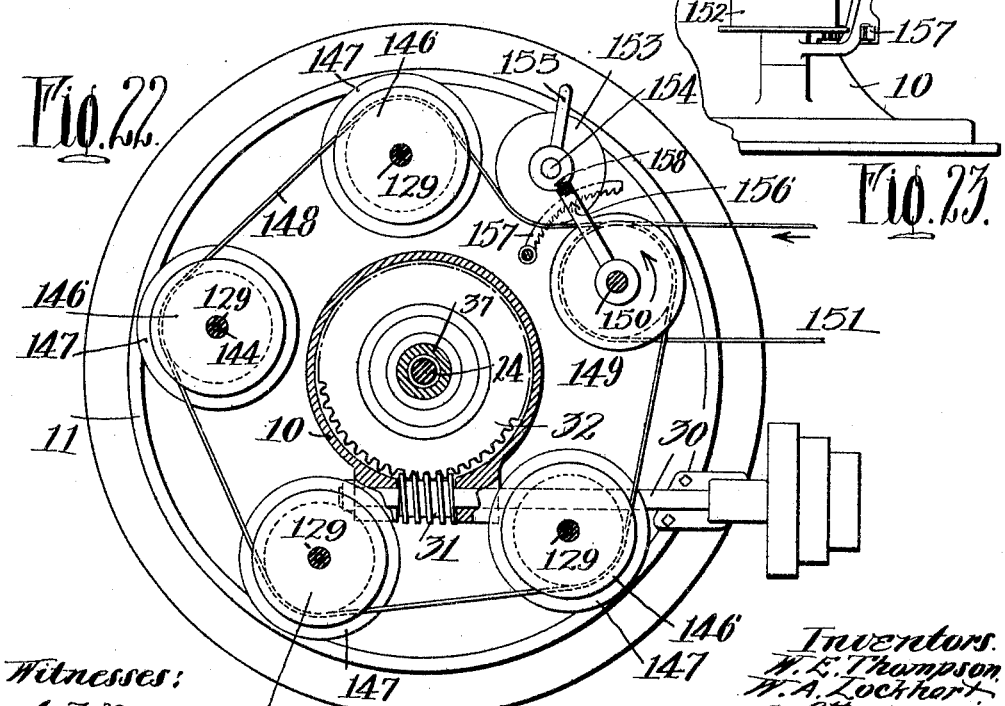

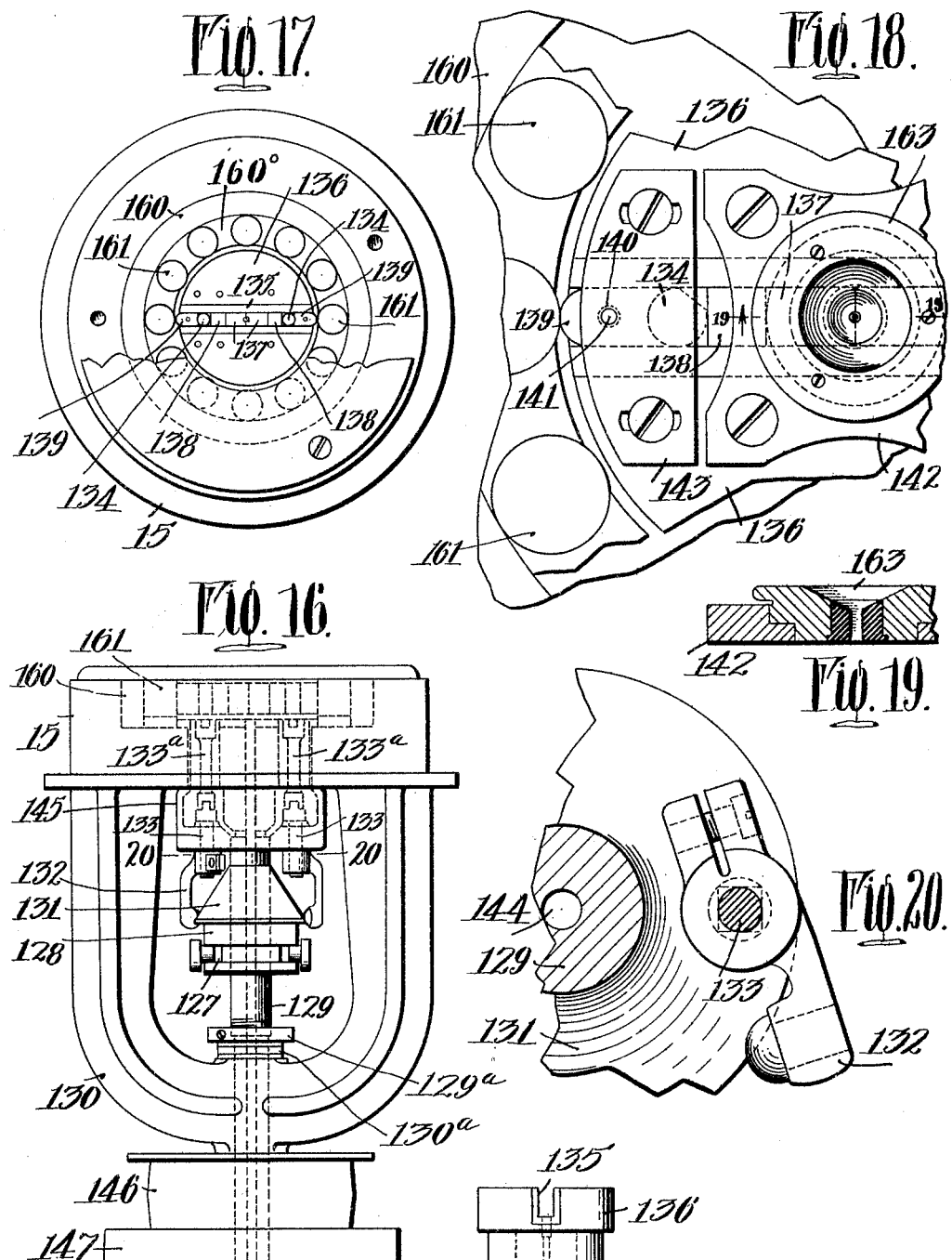

W. E. THOMPSON & W. A. LOCKHART.
SWAGING MACHINE.
APPLICATION FILED MAR. 5, 1913.
1,099,523.
Patented June 9, 1914.
12 SHEETS—SHEET 9.
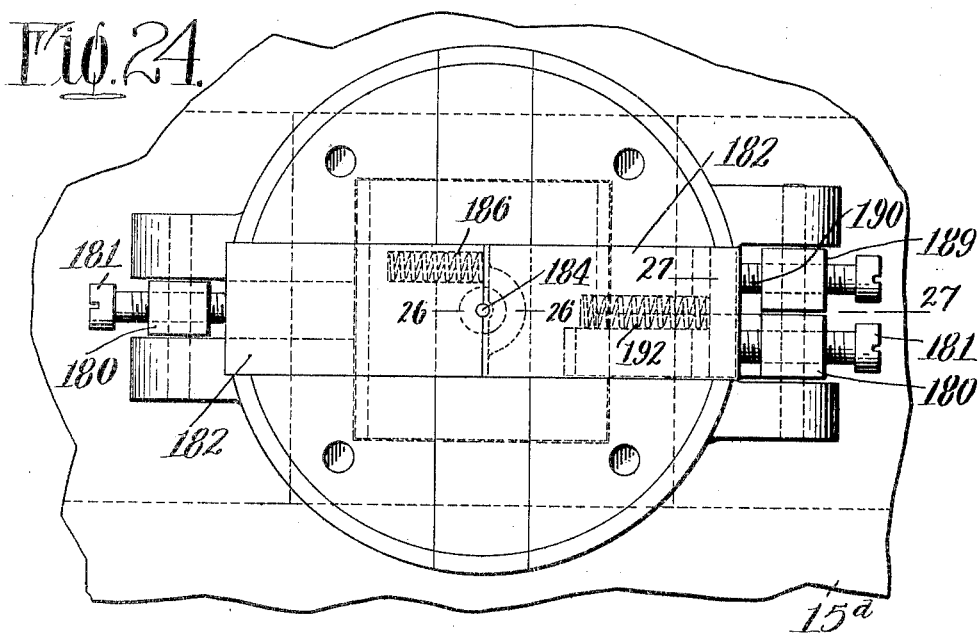
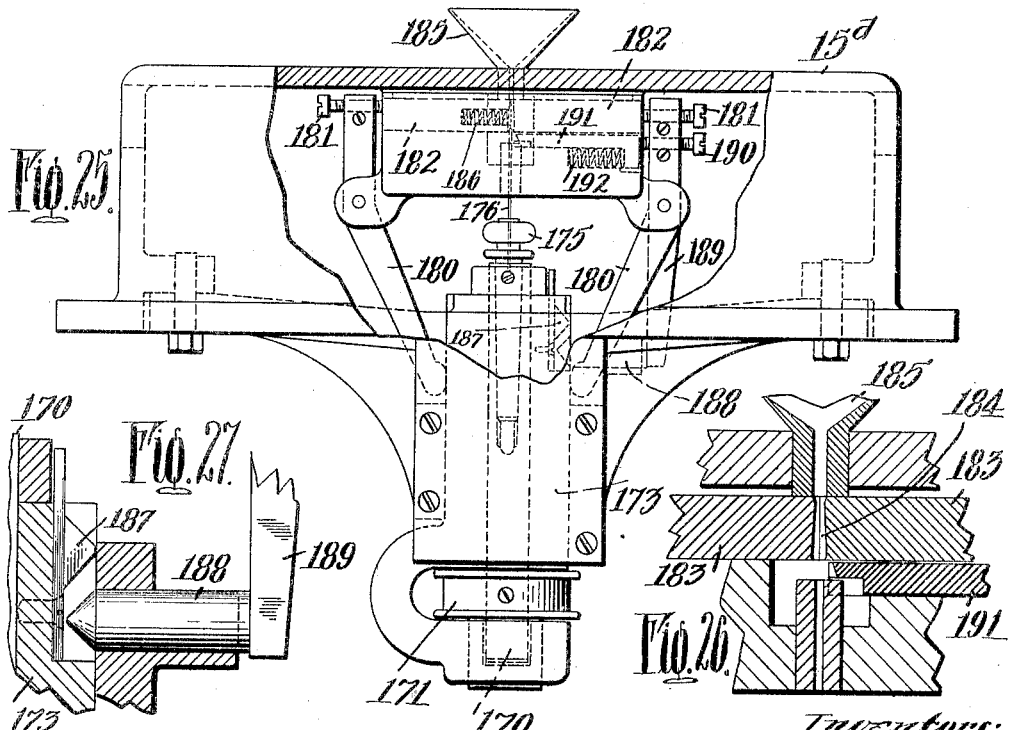
Witnesses:
C. F. Mason
E. M. Allen
Inventors:
W. E. Thompson
W. A. Lockhart
by attorneys
Southgate & Southgate

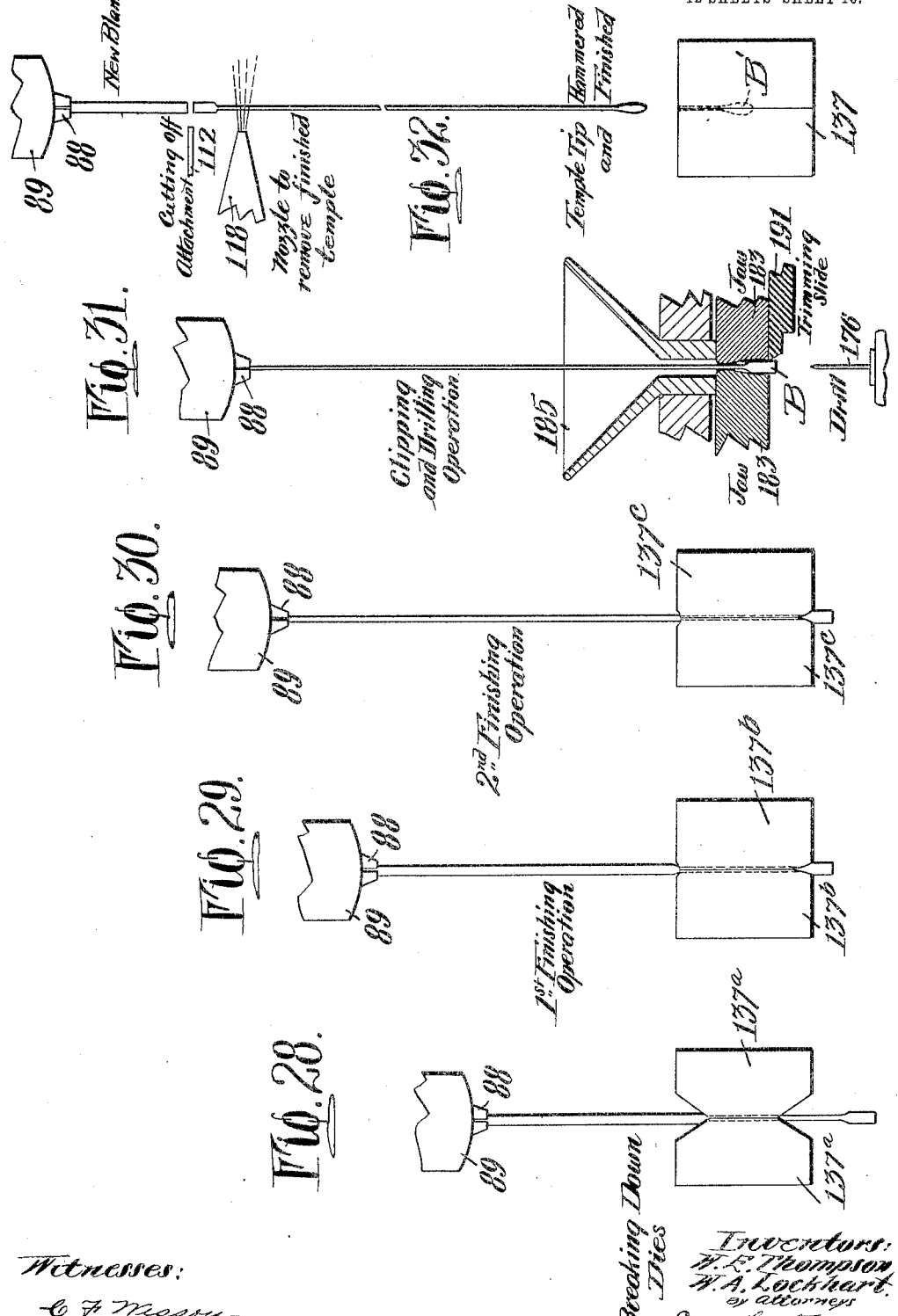

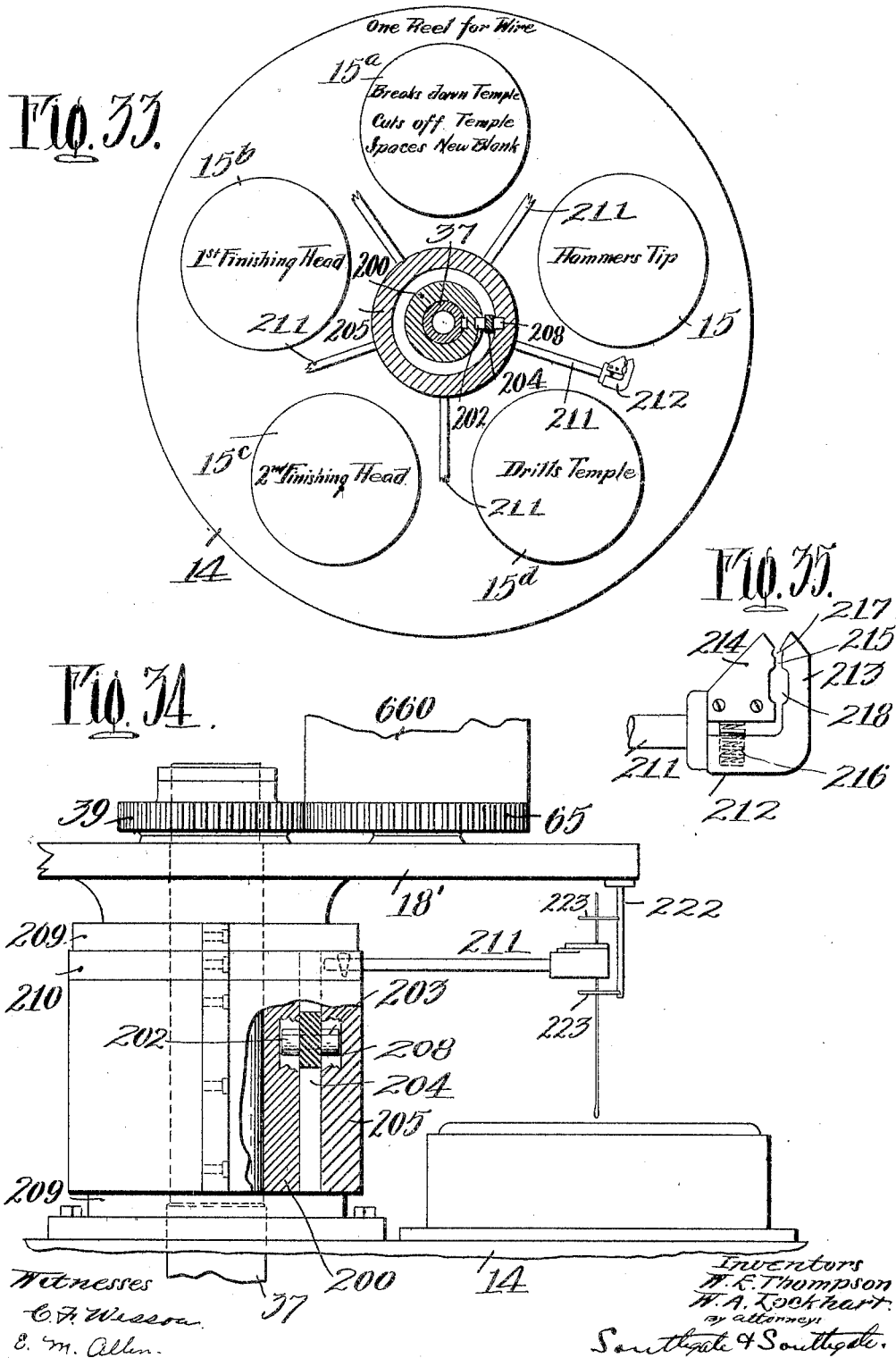

W. E. THOMPSON & W. A. LOCKHART.
SWAGING MACHINE.
APPLICATION FILED MAR. 5, 1913.
1,099,523.
Patented June 9, 1914.
12 SHEETS—SHEET 12.
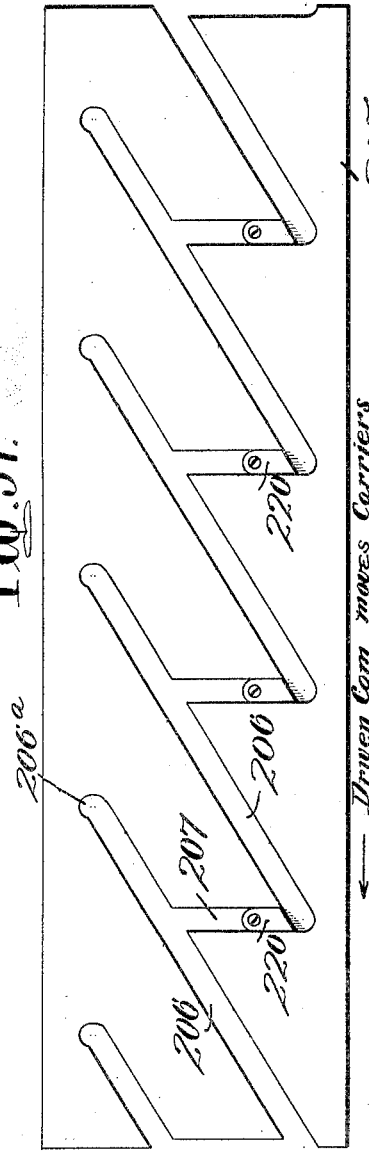
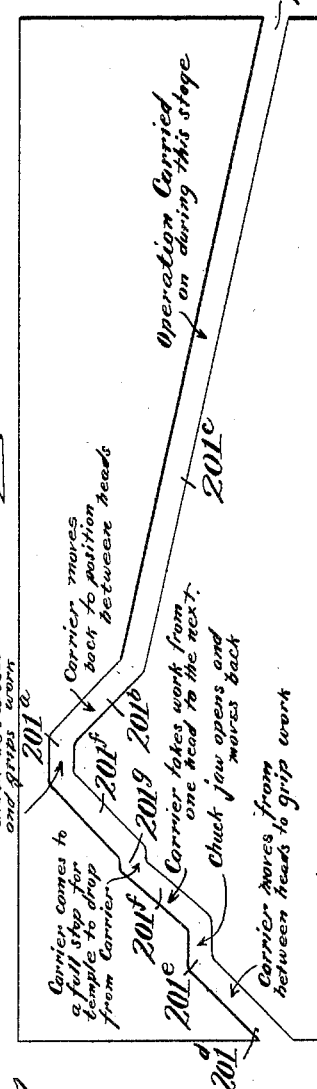
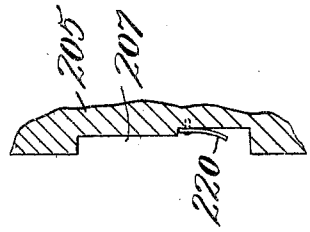

UNITED STATES PATENT OFFICE.

WARREN E. THOMPSON AND WILLIAM A. LOCKHART, OF SOUTHBRIDGE, MASSACHUSETTS; SAID LOCKHART ASSIGNOR TO SAID THOMPSON.

SWAGING-MACHINE.

1,099,523.     Specification of Letters Patent.     Patented June 9, 1914.

Application filed March 5, 1913. Serial No. 752,108.

*To all whom it may concern:*

Be it known that we, WARREN E. THOMPSON, a citizen of the United States, and WILLIAM A. LOCKHART, a subject of the King of Great Britain, both residing at Southbridge, in the county of Worcester and State of Massachusetts, have invented a new and useful Swaging-Machine, of which the following is a specification.

This invention relates to a swaging machine which, while involving principles that are capable of general use, is designed especially for the purpose of swaging spectacle temples, particularly those of the so called "pear tip" type.

The principal objects of the invention are to provide a construction capable of producing a large number of temples in a minimum amount of time, and without the expenditure of an excessive amount of power; to provide a construction in which the operation is entirely automatic from beginning to end, and yet in which it can be controlled by the operator at will; to provide a construction for these purposes which will take up very little room in a shop and will be of simple construction in comparison with the output thereof; to provide a construction and mode of operation by which the finishing dies particularly are much more durable than has been the case heretofore, so that they can be used for long periods of time for finishing the temples accurately to size.

More especially the invention involves arrangements of parts whereby the lubricating oil will flow by gravity between the dies in such a way as to cover all working surfaces; whereby the dirt and chips are automatically carried off by gravity from the dies and under ordinary circumstances cannot be left in the dies; whereby the lubricating oil is carried down through the spindle and out into a reservoir in the base, so that it will not be thrown out into the room, thus doing away with the numerous oil catchers heretofore employed; whereby when the temples break off in the dies the broken part can fall out by gravity in the same way that the chips and dirt fall out, thus eliminating all chance of the broken part coming into such position that it can injure the machine or strain the dies and rolls; whereby the heads are easily gotten at for the making of adjustments, changes, and repairs, and the wear on the spindle is equalized; whereby at the point where the greatest accuracy has to be maintained there is practically no strain caused by the spindle pressing laterally downward and no end wear of the spindle; whereby the temple has no tendency to sag or rest harder on one side than on the other; and whereby the general arrangement is more convenient and compact than has been the case heretofore in this type of machine. These advantages are secured by the use of a vertical arrangement instead of the usual horizontal construction and by the combination with this vertical arrangement of certain features of construction as will appear hereinafter.

The invention also involves improvements in the stock guiding device; in the form of a stock guiding plate on the head; in the way of arranging the dies, anvils, cams, dogs, and operating rolls; in the way of operating a cam for bringing the dies into and out of operative position; in the arrangement of the spindle whereby the vertical pressure or weight of the heads is taken by an end-thrust ball-bearing; in the way of taking care of the oil running through the cam slots which is accomplished by means of an oil ring; in the combination with the stationary slides and heads of a movable carrier to carry the stock intermittently and automatically from position for one operation to the next; in the means for operating the same; in a spring chuck employed for gripping the stock; in a friction between the chuck and reel or at the entrance of the chuck for controlling the movement of the wire into the machine; in a cam roll track connecting two cams for controlling the sequence of operations; in the specific form of cutting off attachment; and in the arrangement of drilling head both for swaging temples and for general use.

In order to carry out these and other features of the invention, the parts are arranged in a novel manner and this arrangement also constitutes a part of the invention. This arrangement involves a number of stationary die carrying heads with a movable carrier to carry the stock automatically and intermittently from one head to the next, the performance of a sequence of operations in the respective heads, a number of slides with their respective cams working in cooperation with the heads, a plurality of reels on one machine for feeding wire to a plurality of heads, and an arrangement of operating means therefor.

The invention also involves other improvements in combinations of parts and details of construction as will appear hereinafter.

Reference is to be had to the accompanying drawings, in which—

Figure 1 is a front elevation of a temple swaging machine constructed in accordance with this invention; Fig. 2 is a front elevation on enlarged scale of a portion of the base with a part of the front broken away and showing the mechanism in section on a central longitudinal plane; Fig. 3 is a transverse sectional view of the same on the line 3—3 of Fig. 2; Fig. 4 is an elevation of the base with parts broken away to show interior construction (also showing the table supported thereby); Fig. 5 is an elevation of a portion of the upper part of the machine with parts in section on a central sectional plane; Fig. 6 is a plan of the parts shown in Fig. 5 with the top ring removed; Fig. 7 is a plan of the locking bolt shown in Fig. 5; Fig. 8 is a sectional view on the line 8—8 of Fig. 1 showing the interior parts in plan; Fig. 9 is a sectional view on the line 9—9 of Fig. 8 showing the upper part of one of the cylindrical cams; Fig. 10 is a sectional view on the line 10—10 of Fig. 8 on enlarged scale showing only the bottom of the slide supporting parts; Fig. 11 is a plan of the parts shown in Fig. 10 below the stationary plate; Fig. 12 is a front elevation of one of the wire manipulating slides and connected parts; Fig. 13 is a sectional view of the same on the line 13—13 of Fig. 12; Fig. 14 is a plan of the machine; Fig. 15 is a horizontal sectional view on the line 15—15 of Fig. 1; Fig. 16 is a front elevation of one of the die heads; Fig. 17 is a plan thereof with the cover plates for the dogs and cams removed; Fig. 18 is a similar view of a portion thereof on enlarged scale with the cover plates in place; Fig. 19 is a sectional view on the line 19—19 of Fig. 18; Fig. 20 is a horizontal sectional view on the line 20—20 of Fig. 16; Fig. 21 is a side view of the top of one of the die spindles; Fig. 22 is a sectional view on the line 22—22 of Fig. 1; Fig. 23 is an elevation of the pulleys and connected parts shown in Fig. 22; Fig. 24 is a plan of the drilling head; Fig. 25 is an elevation thereof, partly in section; Fig. 26 is a sectional view on the line 26—26 of Fig. 24; Fig. 27 is a sectional view on the line 27—27 of Fig. 24; Figs. 28 to 32, inclusive, are diagrammatic views showing the various steps in the operation of the machine; Fig. 33 is a view of a modification showing the carrier in plan; Fig. 34 is a side view thereof on enlarged scale partly in section; Fig. 35 is a plan of one of the carrier heads; Fig. 36 is a view showing the development of the driving cam for the carrier; Fig. 37 is a similar development of the driven cam; and Fig. 38 is a sectional view of a detail of the driving cam.

The invention is shown in the form of a machine mounted on a hollow base 10 having a hollow vertical standard extending upwardly therefrom and surrounded by an integral flange 11 at the bottom providing an annular receptacle for receiving the oil which may drop from the bearings. This standard has a horizontal flange 12 at the top to which is bolted a plate 13 having vertical legs 13$^a$ extending up from it to support a horizontal table 14 above. On the table are mounted a series of stationary heads 15, 15$^a$, 15$^b$, 15$^c$, 15$^d$. In the present instance these are shown as arranged in a circle near the circumference of the circular table 14. At the center of the table it supports a hollow stand 16 Fig. 4 extending upwardly therefrom and from a flange 17 bolted at the center of the table. On the top of this stand it is provided with an integral circular plate 18. The parts so far described are stationary. This plate as shown in Figs. 5, 10 and 12 is provided with a circular outwardly projecting flange 19 at the edge, on the top of which rests a flange constituting a part of a rotary bottom index ring 20. This ring carries upright columns 21 which at their tops support a top index ring 22, these parts constituting a rotary frame. This top ring is in the form of a plate and has at the center thereof a hub 23 (Fig. 5) through which passes the end of a shaft 24 which is fixed to the top of the plate by a nut 25 and washer. This shaft therefore is supported by the rotary frame and depends down through the machine to the bottom and is rotated for the purpose of rotating the frame 20, 21, 22.

Near the bottom of the base is a main driving shaft 30 provided with a worm 31 which drives a worm gear 32 (Figs. 1 and 22). This gear rests on and is fixed to a flange 33 on the bottom of a collar 34 which passes through the gear. The flange is fixed to the gear by a safety pin 35 which is adapted to shear off under heavy strains, but to transmit power under ordinary circumstances. The top of the collar 34 is screw-threaded and a nut 36 screwed down on it over the gear. This collar 34 is mounted on the bottom of a steel sleeve 37 which extends up through the stationary parts above described, and is supported at the top by a nut 38 screwed on the end of the sleeve and resting on a hub on a gear 39 which in turn rests on and is fixed to a cam 40 by means of bolts 41. (Figs. 5 and 6). The gear 39 and cam 40 which are connected by the bolts 41 are adjustable with respect to each other on account of the bolts passing through curved slots 42 in the gear. This cam rests on the plate 18 so that the sleeve is supported therefrom.

On the bottom of the flange 33 is fixed by screws 45 a cam 46 shown in Figs. 2 and 3. This cam thus rotates with the worm gear 32 and during each complete rotation it oscillates a bell-crank 47 in opposition to a spring 48, moves a link 49 longitudinally and carries a spring-pressed ratchet 50 back and forth over the teeth of a ratchet wheel 51, which is fixed to the bottom of the shaft 24. This wheel 51 has as many teeth as there are slides on the index rings, which will be explained hereinafter. It will be seen, therefore, that at each complete rotation of the gear 32 and the sleeve 37 the shaft 24 will rotate one-fifth of a revolution in the present case, there being five teeth on the ratchet wheel 51. The object of the cam 40 is to operate once during each complete revolution of the sleeve 37, and therefore once during one-fifth of a revolution of the shaft 24.

For the purpose of locking the index rings periodically to the stationary plate 18 a bolt consisting of two parts 54 and 55 is shown in Fig. 7. The part 54 has a head 58 separated from it by a neck 59 and entering a recess in the part 55, in which is a spring 60. The bottom index ring is provided with five recesses 61 for receiving the bolt at the above specified intervals, when it is stationary.

The gear 39 meshes with a plurality of gears 65, in this case five in number, arranged around it and supported on the stationary plate 18. Each of these gears is provided with a long cylinder above it designated 66, 66$^a$, 66$^b$, 66$^c$, and 66$^d$. These cylinders are hollow and the cylinder 66 has a hollow central vertical shaft 69 fixed to the plate 18 and extending up through its hub 66$^h$. Inside of the shaft 69 is a vertical shaft 67 extending up through it and rotating with the same. Each of the others has a shaft 67$^a$, fixed to the plate 18, having a nut 68 at the top for holding the same vertically. As shown in Fig. 1 the several cylinders are provided with cam grooves 70 in each of which runs a roll 71 on a horizontal shaft 72. This shaft runs through a block 73 which is provided with removable flanges 74 and is capable of a slight sliding motion in a slot 75 in a vertical slide 76. There is one of these slides for each of the cylindrical cams and each of the slides is guided in vertical ways in each pair of columns 21 so as to receive a vertical sliding motion from the cam. The block 73 is held up by a spring 77. On the outer end of the shaft 72 is a knob 78 by which the shaft can be pulled out by hand to relieve that slide from its cam. It will be understood that the frame involving the bottom ring 20 and the top ring 22 with the columns 21 rotates intermittently around the fixed plate 18. Also the gears 65 rotate on their own axes on the fixed plate. Therefore, as the cylindrical cams are rotated on axes which are fixed and the rolls 71 which they operate are rotated around them, these rolls will automatically pass out of the control of these cams at a certain predetermined time. At this point they pass on segmental tracks 79 which are adjustably supported from the stationary plate 18 by columns 79$^a$ and serve to hold the slides at a constant elevation while they pass from one cam to the next. At a lower point on each cylindrical cam is a projecting pin 80. During the rotation of the cam this pin comes into contact with an arm 81 fixed on a shaft 82 and turns the shaft, thus turning a cam 83 which is fixed thereon. This cam is provided with two projecting surfaces which, upon the turning of the same, come into contact with two levers 84 and swing them on their pivots 85. The result of this is to press down on a cross piece 86 which rests in a slot in the slide on the top of a plunger 87. The levers and cross pieces are located in a recess behind a plate 86$^a$. This plunger is provided at the bottom with a set of spring-jaws 88 which are conical at the bottom and adapted to come into contact with a stationary adjustable internal conical surface of the chuck 89 so that when the plunger is forced down, the jaws will be forced together by this slight motion.

On the top of the index frame are mounted a plurality of reels 90 for the wire to be operated upon. One of these reels is shown for each of the five sections of the machine. The wire from each reel comes down through a fiber bushing 91 fixed in a bracket 92 on the front of each of the slides. The wire is guided through a slot 93 in the slide and a slot 94 in the side of the plunger so as to pass down through the jaws 88 and out at the bottom thereof.

Although it has been stated that the cams are of uniform shape, yet one of them is connected with mechanism for performing a special operation not performed by the others. This is the cylindrical cam 66. At its top it is provided with a series of sockets 96 for receiving a pin 97 on an arm 98 to which its shaft 67 is fixed. Consequently, this shaft rotates with the cam inside the stud or shaft 69 which is fixed in the plate 18, as shown in Figs. 10 and 11. At its lower end this shaft is provided with two cams 100 and 101. The cam 100 operates a roll 102 on a slide 103. This slide is located horizontally on the bottom of the stationary plate 18 and reciprocates radially to a point under the slides as they come around to that point. The plate is provided at its outer end with a steel jaw 104 for assisting in the cutting off operation. This cam 100 is circular through most of its periphery but is provided with a projecting leaf which also has a circular outer surface to hold the jaw in stationary position when it has been projected. It is brought back to a stationary inner position by a spring 113 when the projecting leaf on the cam passes by the roll 102. The position of the cams can be adjusted by the pin and socket connections 96, 97. The slide is provided with a vertical shaft 110 extending down therefrom and having a head on the bottom on which is pivoted an arm 111, said arm being provided with a coöperating cutting off jaw 112. At its other end the spring 113 tends to keep a projection 114 on the lever in contact with the cam 101. This cam is provided with a long circular portion and with a projecting leaf 115 having an arcuate outer surface and also with a projection 116 extending beyond this arcuate surface. The operation of this cam when the leaf 115 moves the projection 114 is to swing the jaw 112 in far enough to grip it into the wire passed down from the slide above so as to hold the wire in fixed position. Then when the projection 116 comes against the projection 114, the jaw 112 is swung clear in to cut off the wire. An adjustment at 117 is provided for regulating the cut. Also mounted on the lever 111 is a nozzle 118 connected with a tube 119 through which a blast of compressed air is directed against the wire to dislodge it after it has been cut. This blast is always in operation, preferably. As the cutting jaw 112 advances toward and into the wire it brings the nozzle almost into contact with the temple and the instant it is cut off the air blows it clear of the head into any receptacle placed in position to receive it.

On the steel sleeve 37 is a gear 120 (Figs. 2 and 15), which drives a series of five gears 121, each provided with a cam 122 thereon. These gears and cams are mounted to rotate on vertical shafts 123 mounted on the plate 13. Each of these cams operates a roll 124. Four of these rolls are mounted on levers 125 and the other one on a similar lever 125$^a$. The levers are pivoted on the vertical legs 13$^a$. Each of the levers 125 is provided with a yoke 126 working in a groove 127 in a vertically adjustable slide 128. This slide is movable up and down by the operation of the lever on a vertical die spindle 129 having an adjustable flange 129$^a$ at the bottom, resting on a ball bearing 130$^a$ on a U-shaped frame 130 depending from the table 14. This bearing thus takes the thrust. The vertical reciprocation of this slide causes a conical cam 131 thereon to operate a pair of die-operating levers 132 which are provided with vertical shafts 133 oscillated by this motion. At the top of each of these shafts is a link 133$^a$ operating a cam 134 (Fig. 18). This cam is of a general circular form but at one side is slabbed off, thus making it exceedingly strong, simple and inexpensive. It is located in a groove formed in a hardened steel box 135 diametrically arranged in the face of a horizontal circular soft steel die plate 136, on the spindle 129. Between the two cams located in this groove on opposite sides of the central die plate are a pair of dies 137, 137$^a$, 137$^b$, and 137$^c$, behind which are anvils 138 for transmitting motion from the cams to the dies. Beyond the cams are dogs 139, each having a passage 140 therein and a fixed pin 141 located in the passage, but of smaller size than the passage. A cover plate 142 is located over the dies and anvil and a second cover plate 143 located over the dogs and cams. These plates are fixed to the die plate 136 and the rounded ends of the dogs project beyond the edge of the die plate. The four vertical die spindles 129 are each provided with a longitudinal passage 144 to allow oil, chips, and broken pieces to fall down through. It also receives the end of the temple while being swaged. Below the die head is an oil ring 145 on the spindle 129 for receiving the oil and directing it into the passage 144.

On the bottom of each shaft is a pulley 146, and a fly wheel 147. These pulleys are rotated by a belt 148 which also passes around a pulley 149 which is integral with a pulley 152. The pulley 152 is rotated by a belt 151 thus rotating 149 also. These pulleys rotate on a shaft 150. An idler pulley 153 is shown for keeping the belt 148 tight, this idler pulley being mounted on a shaft 154 which is fixed on a frame 155 free to swing on the shaft 150 and adapted to be held in adjusted positions by a tooth 156 on the frame and a curved rack 157 pivoted on the frame and held against the tooth by a spring 158. It will be seen therefore that the die plate and spindle have a constant motion of rotation.

Fixed in stationary position surrounding each die plate and spindle is a steel ring 160 inside of which is a rotative roller cage 160$^o$ comprising a steel ring having a series of hardened steel rolls 161 therein surrounding the die plate. These rolls project beyond the surface of the cage outwardly against the ring 160 and also inwardly so as to be engaged by the projecting ends of the dogs in succession as the latter rotate with the die plate.

The wire (or blanks) is fed down to the space between the dies through a guide 163 which revolves with the spindle. This guide is located on the plate 142 which keeps the dies in position in the slot 135. It is to be understood that different dies are located in the different heads as will appear hereinafter.

The lever 125$^a$ is operated like the other levers, but it is maintained in a position under a vertically movable drill spindle 170 shown in Fig. 25. This drill spindle is provided with a pulley 171 operated by a belt 172 independently of the other mechanism and is mounted in a reciprocating carrier 173 which slides vertically on the frame. It is provided with a drill head 175 which carries the drill 176. The motion of this slide up and down carries the drill with it. This drilling operation is for the purpose of forming a hole in the end of the stock. This permits the end to be rounded over afterward in a manner which will appear hereinafter. The motion of the slide also operates a pair of levers 180. Each of these levers is provided with a screw 181 which screws engage a pair of slides 182. These slides are adapted to reciprocate toward and from each other in a horizontal plane and terminate in jaws 183. These jaws are provided with a recess 184 which is smaller at the top than at the bottom so as to be capable of gripping the wire after it has been worked down by the dies. The wire is guided into position to be engaged by these jaws by a conical guide 185. The jaws are provided with a spring 186 for forcing them apart when not positively operated by the movement of the slide 173. The slide 173 is also provided with a cam 187 adapted to engage the conical end of the horizontally slidable pin 188 as the slide moves up and down. This pin engages the end of a lever 189 which through a screw 190 operates a trimming slide 191 that moves along the bottom of the jaws 183 and cuts off the wire to proper length. It will be observed that in Fig. 27 the slide 173 is at its highest position. As it comes down it first forces the pin 188 out in opposition to a spring 192 and then allows it to come in again when the cam 187 passes under the pin 188, and on the return motion of the slide 173 the pin is again forced out. The first reciprocation of the pin cuts off the wire to length, and the second reciprocation cuts off any bur that may have been formed by the entrance of the drill into the end of the stock when the slide is at its highest position.

Having described the mechanism shown in the first twenty seven figures, we will now proceed to describe the operation of the machine for swaging and tipping temples, reference being had especially to Figs. 28 to 32. The stock in the form of a continuous piece of wire mounted on the reels is gripped by the cutting off jaws 104 and 112 which partly cut through it. The wire is thus held from moving by these jaws. The chuck 89 is now released, the slide pulled up away from the cutting off jaws to the required distance to space the new blank correctly, and then the chuck tightens. The cutting off jaws now close over the stock and cut it off completely. Then they move back out of the movement of the slide. The previously finished temple that has been cut off now is dislodged by a blast of air from the nozzle 118. The slide now moves from its former position into line with the next operative head. At this time the index frame starts to rotate and all the rolls 71 pass out of their respective cam grooves of the cams 66, etc., on the tracks 79. They turn around eventually through one-fifth of a revolution, at which point they enter the cam grooves of the next cylinder cams. The cylinder cam which engages the roll having control of the new blank just cut off is of such form that it moves it down into the dies 137$^a$ (Fig. 28) of the first operative head 15$^a$. These are called breaking-down dies, and the cylindrical cam which controls the motion of the blank at this time brings the stock down. Then it is held at rest until the dies have moved in their full movement. Then the slide moves down still farther while the dies operate until a space is reduced sufficient to allow the finishing dies in the next head to close. This preliminary break-down operation having been completed the tapered sleeve 131 on that head is raised to operate the cams 134 and release the dies 137$^a$. Just as this operation is completed the cam groove on the cylinder above operates to raise the chuck holding the blank and draw it out of these dies, the slide having thus been raised to its uppermost position. The next partial rotation now takes place and this roll 71 now moves along out of the cam groove on the track 79 and over into the cam groove of the next cam. This cam now assumes control and moves the blank down into the first finishing dies 137$^b$ in the next head 15$^b$. These dies are operated in a similar manner for the purpose of finishing the blank down nearly to size, as for example from .002 to .005 of an inch larger than the ultimate size of the temple. In doing this the chuck in this slide moves the temple down and back, while the dies are thrown out of operation by their cams 134 as the chuck rises. The roll controlling the slide now passes along the track 79 to the next cylindrical cam which now takes it and performs the operation shown in Fig. 30, called the second finishing operation, by means of dies 137$^c$ in the head 15$^c$. This operation is performed throughout the entire length of the reduced part of the temple and brings it down to its finished diameter. The use of this additional head gives a very smooth temple, and dies stand many more times the amount of work than they would if they were forced to do the whole finishing process. Then in a way which has been described previously, the temple blank is released from these dies and carried over into the control of the next cylindrical cam which immediately operates to bring it down into the guide 185 shown in Figs. 25, 26 and 31 on the head 15ᵈ. Then the jaws 183 are caused to grip on the part of the temple having the small diameter and the taper. This is done by the rise of the slide 173. The chuck is now released and the slide moved up, thus pulling the taper into the gripping jaws. The wire at this time is held by the friction. The stock is slipped in this way so as to insure the temples coinciding with the tip hammering dies 137 and all coming out in uniform lengths. This is necessary on account of hard spots, uneven annealing and other irregularities often found in the stock. This trimming slide 191 trims the ends off and the drill 176 enters the end B of the blank to produce a recess therein. Upon the withdrawal of the drill the trimming slide again operates on the end of the blank to take off any bur that may be left. Then it withdraws again and immediately thereafter the jaws 183 draw back away from each other so as to release the blank. It is then taken to the control of the next cylindrical cam and in that a pair of dies 137 operate in the same way as the three sets of dies previously described, to hammer the tip on the end of the temple to shape by closing in the end over the hole drilled therein. This may be considered as a hammering operation for the purpose of shaping the bead B' of the temple. As soon as this operation is completed the finished temple is moved up to the cutting off attachment shown in Figs. 10 and 11 which then grips the opposite end of the temple. The slide then moves up to space the next blank, the chuck closed, and the jaws 104 and 112 operate to cut clear through the temple, and release it. Then the finished temple is forced from the machine by a blast of air blowing constantly through the nozzle 118.

It will be understood, of course, that all the operations shown in Figs. 28 to 32 are performed simultaneously, under the best working conditions. There are five temple blanks being operated upon simultaneously in the machine, each being subjected to one of the several operations shown in these figures, so that each of the cylindrical cams is always controlling the operation of one blank and each of the sets of dies is operating on a blank. It will be understood also of course, that while we have described a definite number of these operations, namely five, and five feeding slides as well as five operating heads, yet in classes of work which require more or less finishing or roughing operations the number of slides and heads will be varied accordingly.

Another way in which a part of the invention can be carried out is shown in the last six figures of the drawings. This modification is designed mainly for the purpose of securing substantially the same results without providing any relative horizontal motion between the series of die heads and the blank operating slides, and according to this modification the heads 15, 15ᵃ, etc., are mounted in stationary position on a table 14 as before and the slides are operated as before through the sleeve 37, gears 39 and 65, and cams 660. In this case the gear 65 and cams 660 are mounted on a stationary plate 18', which takes the place of the stationary plate 18 of the other form shown, and the slides, although not shown in these figures, are constructed substantially as in the first modification shown. Their vertical operation is also the same, but they have of course no rotary motion. The cams 660 are shaped to provide the necessary dwell instead of having that provided for by the plates 79 in the first form. In this case, however, only one reel for wire is necessary, as all the wire is fed down at one point and by one slide. In this case also the wire is fed down to the head 15ᵃ in which the temple is broken down, cut off and the new blank spaced in the manner set forth in describing the first modification. The temple is drawn up out of this head 15ᵃ and gripped by a rotary carrier which rotates one-fifth of a revolution so as to present it to the next slide, over the head 15ᵇ. Here the first finishing operation is performed in the manner previously described. Then the temple is raised by that slide, then it is again gripped by the carrier which takes it to the second finishing head 15ᶜ where it is again released by the carrier and gripped by the slide and operated upon as before. In the same manner it is taken to the drilling head 15ᵈ and drilled and then taken to the head 15 where the tip is hammered and thereafter it is discharged from the machine in a manner which will appear. It will be seen that each one of the cams 660 in this case is shaped for the purpose of performing its special operations, as was the case in the other form described, but in this case the steps of the operation are slightly different and the cams are changed accordingly. These cams are not illustrated in detail, as the description already given is thought to be sufficient.

Referring now to the last six figures, it will be seen that the sleeve 37 which operates the cams 660 and which constantly rotates, is provided with a driving cam 200 keyed thereto. This cam has a cam groove 201 in which operates a roll 202 on a shaft 203 which shaft is carried by a vertically reciprocable slide 204. This slide is mounted between the surfaces of the cam 200 and a driven cam 205 which has cam grooves 206—207 for receiving a roll 208 on the outer end of the shaft 203. Both of these cams are of cylindrical form, the groove 202 of the inner cam being located in the outer convex surface thereof, while the grooves 206—207 on the outer cam are located in the inner concave surface thereof. The outer cam is mounted so as to be capable of an intermittent rotary motion around the center of the shaft 37, but is incapable of any vertical motion. For this purpose it is shown as contained between two collars 209 on which its ends bear. On the cam 205 is fixed a carrier 210 having a series of five radial arms 211, each being provided with a head 212 having a fixed jaw 213 and a spring-pressed jaw 214. Between these jaws is a passage 215 which is tangential. The jaw 214 is pressed tangentially by a spring 216. The passage 215 is provided with a small enlargement 217 for gripping a temple and with a larger enlargement 218 behind it through which the temple is adapted to drop. The outer ends of the jaws 213 and 214 are beveled off to guide the temple into the slot 217. The operation of the driven cam will be understood from reference to the last three figures of the drawings. At the highest point in the cam groove 201, namely the point 201$^a$, the double roller is stationary for a short period and it will be obvious that the outer roll is in the highest extension 206$^a$ of one groove 206 on the outer cam. It is at this time that the chuck held by the first slide advances and grips the work. Now as the sleeve 37 continues to rotate, the roll 202 enters a slanting portion 201$^b$ of the cam slot and is forced down with a rapid motion. This causes the roll 208 also to move down of course and this forces the driven cam 205 to move backward to the right until the roll 208 enters the vertical slot 207 which constitutes a branch of the cam groove 206. This occurs when the roll 202 enters a long straight gradually slanting portion 201$^c$ of the cam groove 201. Therefore, it will be seen that during this part of the complete rotation of the sleeve 37, that is during about two-thirds of a complete rotation, the rolls are forced gradually downward from the top of the slot 207 to the bottom thereof and during that period the cam 205 and consequently the carrier, are stationary. It is during this period that the operations are carried on upon the stock by the several die heads 15, etc. When the rolls reach the bottom of their motion, the roll 202 enters an oppositely and rapidly inclined portion 201$^d$ of the cam slot and at the same time the roll 208 passes beyond a spring 220 in the slot 207. Consequently the rise of the two rolls does not cause the roll 208 to move back up the slot 207 but causes it to move forward along the next slot 206. As the force supplied to the rolls by the driving cam 200 operates only to raise the rolls, it is obvious that this motion will force the driven cam around to the left in Fig. 37, that is forwardly. This causes the carrier to move from between the heads for the purpose of gripping the work. Having made this motion, the roll 202 encounters a horizontal portion 201$^e$ of its cam groove and thus leaves the carrier in stationary position for a short time. It is now that the chuck jaws open and move back according to the arrangement described in connection with the other form of the invention. This having been accomplished, the roll 202 enters another incline 201$^f$ and the carrier proceeds to complete the taking of the work from one head to the next. Another dwell 201$^g$ is encountered half way along this incline 201$^f$ and this causes the carrier to come to a full stop half way between two of the heads to permit a finished temple to drop from the carrier. This having been accomplished, the carrier proceeds to the end of this motion when the rolls are at the top of their motion and in the position 201$^a$ and 206$^a$ ready to commence the cycle of operations again. The way in which the temple is removed from the carrier is very simple. On the bottom of the stationary plate 18′ is a vertical rod 222 located half way between the two heads 15 and 15$^a$. This is provided with a pair of horizontal knockout wires 223 located one below and the other above the position of the carrier head. When the temple carried in the slot 217 comes into contact with these wires 223 which are in fixed position, they force the spring 216 to yield and as the carrier advances positively, the temple is forced back along the slot 215 into the enlargement 218. It is then not supported at all and is free to drop and it is at that point that the dwell occurs caused by the horizontal portion 201$^g$ of the driving cam slot. The details of the operations on the blank need not be described at this point as they are substantially the same as those described before, except that the cutting off operation occurs at a different point. By this arrangement, however, the rotation of the entire set of slides is avoided and the mechanism simplified in some respects but the general results obtained are otherwise the same.

Although we have illustrated and described only two forms in which the invention is carried out, we are aware of the fact that many other modifications can be made therein without departing from the scope of the invention as expressed in the claims. Therefore, we do not wish to be limited to the details of construction herein shown and described, but What we do claim is:—

1. In a swaging machine, the combination of a head having a vertical passage therein extending down from the top, means for introducing a blank into said passage from the top, means for breaking down the blank and lengthening the same while in the passage, means for then moving the blank down farther while the breaking down means is operating, means for rendering the breaking down means inoperative, and means for then withdrawing the blank from the top.

2. In a swaging machine, the combination of a head having a vertical passage therethrough extending down from the top, means for introducing a wire into said passage from the top comprising jaws for gripping the wire and moving it along, means for gripping the blank at a distance from the jaws, means for then cutting off the blank beyond the jaws, and means for swaging the blank while held by said jaws.

3. In a swaging machine, the combination of a head having a vertical passage therethrough extending down from the top, means for introducing a wire into said passage from the top comprising jaws for gripping the wire and moving it along, means for cutting off the blank, a second head having a vertical passage therein extending down from the top provided with reducing dies therein, and means whereby the blank previously cut off is introduced into the second head from the top.

4. In a swaging machine, the combination of a head having a passage, means for introducing a blank into said passage from one end, means for breaking down the blank and lengthening the same while in the passage, means for then moving the blank along farther in the same direction while the breaking-down means is operating, means for rendering the breaking-down means inoperative, and means for then withdrawing the blank from the end into which it was introduced.

5. In a temple swaging machine, the combination of a set of stationary heads each provided with a vertical passage extending down from the top thereof, a series of slides arranged above said heads and each adapted to move from one head to another, said slides having means for gripping a blank to be operated upon and holding it in vertical position, means for individually operating said slides vertically to introduce blanks held thereby into the heads and thereafter withdraw them therefrom, and means in the heads for operating on the blanks.

6. In a temple swaging machine, the combination of a set of heads each having a passage therethrough extending down from the top thereof, a series of relatively movable slides of a number equal to the number of heads, each having means for gripping a blank, means for lowering said slides to introduce the blanks therein into the respective heads, means for cutting off the work, means carried by one head for breaking down the stock of a blank introduced therein, and means carried by another head for finishing that part of the blank introduced therein which has been broken down.

7. In a temple swaging machine, the combination of a set of heads, a series of relatively movable slides of a number equal to the number of heads, each having means for gripping a blank, means for moving all of said slides to introduce the blanks therein into the respective heads, means for cutting off the work, means carried by a head for performing a preliminary breaking-down operation on a blank introduced therein, means carried by another head for reducing the same portion of the blank approximately to size, and means carried by another head for finishing the reduced portion of the blank.

8. In a temple swaging machine, the combination of a stationary set of die heads, means connected with each of said die heads for performing operations on blanks, said die heads being arranged in vertical position, a horizontally movable support above the die heads, and a series of vertically movable slides on said support, each having means for gripping a blank and moving it down into one of the heads.

9. In a temple swaging machine, the combination of a stationary set of die heads, means connected with each of said die heads for performing operations on the blanks, said die heads being arranged in vertical position, a horizontally movable support above the die heads, a series of vertically movable slides on said support, each having means for gripping a blank and moving it down into one of the heads, means on said support for simultaneously lowering said slides and then raising them, and means for holding them raised and moving each one along to another head while in raised position.

10. In a temple swaging machine, the combination of a set of die heads, means connected with them for operating on blanks held therein, a frame movable in a path adjacent to the die heads, a set of slides on said frame, means for moving said frame intermittently to carry each slide from one head to another, and means on said frame for moving all the slides back and forth when in registration with the heads.

11. In a temple swaging machine, the combination of a die head, means for swaging blanks held therein, a frame movable in a path above said head, a set of slides on the frame, means for moving the frame over the head, and means for raising and lowering the slides, the last named means comprising a series of rotary cams mounted to rotate on vertical stationary axes, means for constantly rotating said cams, and means for connecting each cam in succession with the slides.

12. In a swaging machine, the combination of a set of die heads, means connected with them for operating on blanks held therein, a frame movable in a path above the die heads, a set of slides on said frame equal in number to the number of heads, means for moving said frame intermittently to carry each slide from one head to another, and means for lowering and raising all the slides when in registration with the heads, said means comprising a series of rotary cams mounted on vertical stationary axes, means for constantly rotating said cams, and means for connecting each cam in succession with the slides.

13. In a swaging machine, the combination of a stationary support, a series of cylindrical cams on said support, means for rotating said cams on their own axes, a rotatable frame carried by said support, means for rotating said frame intermittently, a series of slides on said rotary frame movable in a direction parallel with the axes of rotation thereof, and means on each slide for connecting it with one of said cams as the slide passes each of the cams, whereby the cam will reciprocate the slide.

14. In a swaging machine, the combination of a stationary support, a series of cylindrical cams on said support, means for rotating said cams on their own axes, a rotatable frame carried by said support, means for rotating said frame intermittently, a series of slides on said rotary frame movable in a direction parallel with the axis of rotation thereof, means on each slide for connecting it with one of said cams as the slide passes each of the cams, whereby the cam will reciprocate the slide, jaws on each slide, and means on each of said cams for closing the jaws as the slides move forward.

15. In a swaging machine, the combination of a stationary support, a series of cylindrical cams on said support, means for rotating said cams on their own axes, a rotatable frame carried by said support, means for rotating said frame intermittently, a series of slides on said rotary frame movable in a direction parallel with the axis of rotation thereof, means on each slide for connecting it with one of said cams as the slide passes each of the cams, whereby the cam will reciprocate the slide, jaws on each slide, means on each of said cams for closing the jaws as the slides move forward, and means whereby a wire is guided into and through the jaws of each slide.

16. In a swaging machine, the combination of a stationary support, a series of cylindrical cams on said support, means for rotating said cams on their own axes, a rotatable frame carried by said support, means for rotating said frame intermittently, a series of slides on said rotary frame movable in a direction parallel with the axis of rotation thereof, means on each slide for connecting it with one of said cams as the slide passes each of the cams, whereby the cam will reciprocate the slide, jaws on each slide, and means on each of said cams for closing the jaws, said means comprising a pin on each of said cams, a shaft having an arm on it in position to be operated by said pins as the cam rotates, a cam on said arm, a pair of arms in position to be turned by said cam, and a plunger in contact with said arms reciprocably mounted on the slide and connected with the jaws.

17. In a temple swaging machine, the combination of means for holding a blank, means for trimming and drilling the end of the blank, means for shaping the drilled end and means for moving the holding means from said trimming and drilling means to said shaping means.

18. In a temple swaging machine, the combination of a set of heads, a series of slides each having means for gripping a blank, means connected with one of said slides for trimming and drilling the blank, means carried by another head for shaping the drilled end, and means for moving the slides to carry a blank from said drilling means to said shaping means.

19. In a temple swaging machine, the combination of a series of heads, a series of slides located adjacent thereto for holding blanks, means connected with one of said slides for cutting off a blank when held by the slide, means carried by one of said heads for swaging a blank when held by the same slide, and means for moving said slide into registration with said swaging means.

20. In a temple swaging machine, the combination of a series of heads, a series of slides located adjacent thereto for holding blanks, means connected with one of said slides for cutting off a blank, means carried by one of said heads for swaging a blank held by a slide, means carried by another head for drilling a hole in the end of the blank, while still held by the same slide, and means carried by still another head for hammering the end of the blank and finishing a pear tip thereon while still held by the slide, said slide being movable into registration with said heads in succession.

21. In a temple swaging machine, the combination of a series of heads, a slide located adjacent thereto for holding blanks and carrying them into registration with all of said heads, means for cutting off the blank while held by said slide, means carried by one of said heads for breaking down the blank when introduced therein by the slide, means carried by another head for reducing the blank approximately to size when introduced by the slide into that head, means carried by another head for finishing the blank when introduced therein by the slide, and means carried by another head for drilling a longitudinal hole in the end of the blank.

22. In a temple swaging machine, the combination of a series of heads, means carried by one of said heads for breaking down a blank when introduced therein, means carried by another head for reducing the blank approximately to size when introduced into that head, means carried by another head for finishing the blank when introduced therein, means carried by another head for drilling a hole in the end of the blank and for cutting off the drilled end of the blank to a definite length, and means for introducing a blank successively into said heads.

23. In a temple swaging machine, the combination of a series of heads, means for cutting off a blank, means carried by one of said heads for breaking down the blank when introduced therein, means carried by another head for reducing the blank approximately to size when introduced into that head, means carried by another head for finishing the blank when introduced therein, means carried by another head for drilling a longitudinal hole in the end of the blank, means carried by the last named head for cutting off the end of the blank to length before the drilling operation and for trimming off the bur thereof after the drilling operation, and means for introducing a blank successively into said heads.

24. In a temple swaging machine, the combination of a series of heads, a series of slides located adjacent thereto for holding blanks, means connected with one of said slides for cutting off the blank, means carried by one of said heads for breaking down the blank when introduced therein, means carried by another head for reducing the blank approximately to size when introduced into that head, means carried by another head for finishing the blank when introduced therein, means carried by another head for drilling a hole in the end of the blank, means carried by another head for hammering and finishing a pear-tip on the drilled end of the temple blank, and means for moving said slides to introduce a blank held thereby successively in said heads.

25. In a temple swaging machine, the combination of a series of heads, a series of slides for gripping and carrying blanks, means carried by a plurality of said heads for hammering the blanks and reducing them to a finished condition while held by one of said slides, means carried by another one of said heads for drilling a hole longitudinally in the end of each blank while held by the same slide, and means carried by another head for hammering over the drilled end of the blank and forming it into a pear-tip while still held by the same slide.

26. In a temple swaging machine, the combination of means for drilling a hole longitudinally in the end of a blank, means for hammering over the drilled end of the blank and forming it into a pear tip, and means for moving the blank from said drilling means to said pear-tip forming means.

27. In a swaging machine, the combination of means for finishing a blank, a pair of jaws, means for introducing a blank between said jaws, means for clamping the blank by the jaws, and means adjacent to the jaws for drilling the end of the blank longitudinally while held in the jaws.

28. In a swaging machine, the combination of a head, dies thereon for finishing a blank, a second head, a pair of jaws thereon, means for introducing a finished blank between said jaws, means for clamping the blank by the jaws, means on said head for cutting off the end of the blank when held by the jaws, and means on said head in position for drilling the end of the blank longitudinally when held by said jaws.

29. In a swaging machine, the combination of means for finishing a blank, a pair of jaws, means for introducing a finished blank between said jaws, means for clamping the blank by the jaws, means for cutting off the end of the blank when held by the jaws, means in position for drilling the end of the blank longitudinally when held by said jaws, and means for thereafter operating the cutting off means to trim off the bur at the end of the blank.

30. In a temple swaging machine, the combination of a series of slides for gripping and carrying blanks, means for drilling a hole longitudinally in the end of each blank, means for hammering over the drilled end of the blank and forming it into a pear-tip, means for moving the slides to the drilling means and then to the hammering means, and means operating in connection with the slides for cutting off the blank so finished.

31. In a temple swaging machine, the combination of a frame, means thereon for drilling a hole longitudinally in the end of a blank, means on the frame for hammering over the drilled end of the blank and forming it into a pear tip, means on the frame for operating said drilling and hammering means, and means for moving a blank to said drilling means and thereafter to said hammering means.

32. In a temple swaging machine, the combination of a vertical frame, a table supported thereon, a series of die heads carried by said table, a hollow stand extending up from the table, a frame carried by said hollow stand, an index frame rotatably mounted on the last named frame a shaft extending down through the hollow stand and table from the index frame, and means under the table for rotating the shaft.

33. In a swaging machine, the combination of a vertical frame, a table supported thereon, a series of die heads carried by said table, a hollow stand extending up from the table, a frame carried by said hollow stand, an index frame rotatably mounted on the last named frame, a shaft extending down through the hollow stand and table from the index frame, a series of wire-carrying reels supported on said rotary frame, slides on said frame, one for each reel for taking the wire therefrom and moving it down into said heads, and means under the table for rotating the shaft.

34. In a swaging machine, the combination of a hollow base, a table carried thereby, a stand extending up from the table, a support on the top of the stand, all of said parts being stationary, a frame-work rotatably mounted on said stand, a shaft extending down through the stand and table, means for rotating said shaft, a series of heads connected with said table, dies in said heads, means carried adjacent to said table for controlling the opening and closing of said dies, and means connected with said rotating heads for operating said die-controlling means.

35. In a swaging machine, the combination of a base, a stationary table thereon, a series of heads carried by said table, said heads being provided with dies, a vertically reciprocable cam located under each set of dies, a lever for controlling the opening and closing of said dies in position to be operated by said cam, a central gear, a series of cams operated by said gear, means connected with each of said vertically reciprocable cams and with one of the last named cams for operating the reciprocable cams, and means located above the heads for introducing blanks into the heads from above.

36. In a swaging machine, the combination of a base, a table thereon, a series of heads carried by said table, said heads being provided with dies, means for controlling the opening and closing of said dies, a central gear above said table, a series of cams surrounding said central gear and operated by said gear, and means located above the heads and controlled by said cams for introducing blanks into the heads from above.

37. In a swaging machine, the combination of a base, a table thereon, a series of heads carried by said table, said parts being stationary, dies mounted on said heads, a sleeve running up through said base and table, a gear on the top of the sleeve above the table, a series of gears surrounding said gear and meshing therewith, cylindrical cams carried by said series of gears, and a series of slides, each controlled by one of said cams and each having means for raising and lowering a blank into and out of the dies in said heads.

38. In a swaging machine, the combination of a table, a series of heads carried by said table, dies mounted on said heads, a sleeve running up through said table, a gear on the top of the sleeve above the table, a series of gears surrounding said gear and meshing therewith, rotary cams carried by said series of gears, and a series of slides each controlled by one of said cams and each having means for raising and lowering a blank into and out of the dies in said heads, rotary means for transferring the blanks from one head to another, and means connected with said sleeve for intermittently operating the rotary means.

39. In a swaging machine, the combination of a table, a series of die heads carried by the table, a sleeve extending up through the table, means for constantly rotating said sleeve, a series of vertically movable slides above the table for moving blanks into and out of said heads, means connected with said sleeve for operating the slides, means for transferring the blanks from one head to another, said means being adapted to rotate around said sleeve, and means connected with said sleeve for intermittently rotating said carrying means.

40. In a swaging machine, the combination of a fixed table, die heads thereon, a vertical sleeve rotatably mounted therein and extending both above and below the table, means for rotating said sleeve constantly, a shaft extending down through said sleeve, a ratchet wheel on the bottom of said shaft, a cam on the bottom of said sleeve, means operated by said cam for operating the ratchet wheel through a part of a revolution for each revolution of the cam, means operated by said shaft for feeding blanks into said die heads, and means operated by the sleeve for operating the dies of the die heads.

41. In a swaging machine, the combination of a table, a series of die heads carried by said table, a sleeve extending up through the table, means for rotating said sleeve constantly, a rotary frame above said table supported by said sleeve, a shaft extending from said rotary frame down through the sleeve and connected with the rotary frame for rotating it, and means on the bottom of said sleeve for intermittently rotating said shaft from the sleeve.

42. In a swaging machine, the combination of a fixed table, die heads thereon, a vertical sleeve rotatably mounted therein and extending both above and below the table, means for rotating said sleeve constantly, a shaft extending down through said sleeve, means operated by said shaft for operating the sleeve through a part of a revolution for each revolution of the shaft, and means for positively stopping the rotary frame in predetermined positions between its intermittent rotations and temporarily locking it in said positions.

43. In a swaging machine, the combination of a fixed plate, a shaft extending up through the plate, a frame fixed to said shaft, means for rotating said shaft intermittently, said frame having a plurality of recesses therein, a cam, means for rotating the cam constantly, and a locking bolt controlled by said cam for engaging in said recesses and locking the frame to the plate periodically.

44. In a swaging machine, the combination of a plate, a hollow sleeve extending up through the plate, means for rotating said sleeve constantly, a cam on said sleeve, a bolt radially movable on said plate, a shaft extending up through said sleeve, means for moving said shaft around a part of a revolution for each complete revolution of the sleeve, a frame carried by and rotatable with said shaft and having a series of recesses therein equal to the number of partial revolutions which the shaft makes to each revolution of the sleeve, said bolt being located in position to enter said recesses as they pass it and lock the frame.

45. In a swaging machine, the combination of a plate, a frame rotatable by an intermittent motion upon said plate, said frame having a plurality of recesses at its inner circumference, a bolt on said plate adapted to enter said recesses, said bolt comprising two members, one having a plunger on the end thereof and the other having a socket in which said plunger is located, a spring in said socket pressing on the plunger, and means for periodically operating said bolt to engage in said recesses.

46. In a swaging machine, the combination of a plate, a series of cylindrical cams mounted to rotate on a vertical axis on said plate and arranged in a circle, means for rotating said cams, a frame surrounding said plate, means for rotating said frame intermittently, a series of slides supported by said frame, a chuck on each slide movable therewith for operating blanks, and means for connecting each slide with one of said cams whereby the rotation of the cams will reciprocate the slides, said means comprising a transverse longitudinal slidable shaft having a roller for engaging the cam, and having a head by which the shaft can be moved and the roller disengaged from the cam.

47. In a swaging machine, the combination of a plate, a series of cylindrical cams each mounted to rotate on a vertical axis on said plate and arranged in a circle, means for rotating said cams, a frame surrounding said plate, means for rotating said frame intermittently, a series of slides supported by said frames, a roller for connecting each slide with the cam groove of one of said cams, whereby the rotation of the cams will reciprocate the slides, and means for receiving each roller from its cam groove as the frame rotates and carry said roller from one cam to the next.

48. In a swaging machine, the combination of a stationary circular plate, a frame rotatably mounted thereon, means for rotating the frame intermittently, a series of shafts mounted on said plate and arranged in a circle, a cylindrical cam mounted to rotate on each of said shafts, means for simultaneously operating said cams, a series of slides operated by said cams for supporting the work to be operated upon, and an adjustable arcuate track extending from each cam to the next one for holding said slides up while the frame rotates from one cam to the next.

49. In a swaging machine, the combination of a plate, a frame rotatable thereon, a series of slides carried on the frame, a series of rotatable cams on the plate for operating said slides, a shaft for one of said cams extending through the plate, a cutting attachment connected with and operated by said shaft, and means for adjusting said shaft circumferentially to control the operation of said cutting attachment.

50. In a swaging machine, the combination of a plate, a frame rotatable thereon, a series of slides on the frame, a series of rotatable cams on the plate for operating said slides, a shaft for one of said cams extending through the plate, a cutting attachment connected with and operated by said shaft, said cutting attachment comprising a slide, a jaw on the slide, a cam on the shaft for moving said jaw radially, a second cam on the shaft having an eccentric leaf and a projection beyond said leaf, and a second jaw pivotally mounted on said slide and having a lever adapted to engage the second cam.

51. In a swaging machine, the combination of a plate, a frame rotatable thereon, a series of slides carried on the frame, a series of rotatable cams on the plate for operating said slides, a shaft for one of said cams extending through the plate, a cutting attachment connected with and operated by said shaft and comprising a pivoted jaw, and an air nozzle mounted on said jaw for discharging the work from the machine.

52. In a swaging machine, the combination of a frame, a series of cams each rotatable on its own axis and arranged adjacent to said frame, a series of slides carried by said frame, adjustable means for connecting each slide with one of the cams, a chuck on each slide, means for guiding a wire into the chuck, a pin on each cam, and means operated by each pin for controlling the operation of the chucks.

53. In a swaging machine, the combination of a cylindrical cam rotatable on its own axis and having a cam groove, a roller mounted to rotate in said groove, a shaft on which the roller is located, a slide movable along parallel with the axis of said cam, a block in said slide through which the shaft projects, said block having a slight reciprocating motion in the slide, a spring connecting the slide with the block, a chuck on the slide, means on the slide for controlling the opening and closing of the chuck, and means on said cam for operating said opening and closing means.

54. In a swaging machine, the combination of a cylindrical cam rotatable on its own axis, a slide adjacent thereto, means for connecting the slide with the cam for reciprocating the slide, a shaft on the slide having an arm thereon, a pin on the cam in position to engage and turn said arm, a cam on said arm, a pair of levers in position to be engaged by said cam when the arm is turned, and a chuck on said slide operated by said levers.

55. In a swaging machine, the combination of a cylindrical cam rotatable on its own axis, a slide adjacent thereto, means for connecting the slide with the cam for reciprocating the slide, a shaft on the slide having an arm thereon, a pin on the cam in position to engage and turn said arm, a cam on said arm, a pair of levers in position to be engaged by said cam when the arm is turned, and a chuck on said slide operated by said levers, said slide having a passage therethrough to the chuck for the introduction of a wire into the chuck.

56. In a swaging machine, the combination of a frame, a slide movable thereon, means for raising and lowering the slide, a chuck on the slide, means connected with the raising and lowering means for opening and closing the chuck periodically, said slide having a passage for guiding a wire to the chuck, and a reel above said slide for supplying the wire to said passage.

57. In a swaging machine, the combination of a frame, a slide movable thereon, means for raising and lowering the slide, a chuck on the slide, means connected with the raising and lowering means for opening and closing the chuck periodically, said slide having a passage for guiding a wire to the chuck, and a reel above said slide for supplying the wire to said passage, said slide also having a friction device adjacent to said passage for leading the wire thereto.

58. In a swaging machine, the combination of a fixed table, a gear rotatable about the center thereof, a series of gears surrounding said gear and meshing therewith, a cam operated by each of said series of gears, a lever operated by each cam, a conical sleeve mounted to slide vertically and operated by each of said levers, a series of sets of dies, and means connected with and operated by each of said sliding sleeves for controlling one of said sets of dies.

59. In a swaging machine, the combination of a die head, a shaft concentric therewith, a set of dies in the die head, cams for controlling the operation of said dies, a sliding conical sleeve on said shaft for operating said cams to control the operation of said dies, and means for periodically raising and lowering said conical sleeve.

60. In a swaging machine, the combination of a die head, a shaft concentric therewith, a set of dies in the die head, cams, means for operating said cams to control the operation of said dies, an adjustable collar on the bottom of the shaft, a frame through which said shaft passes, and end-thrust ball bearings on said frame under said collar.

61. In a swaging machine, the combination of a table, a series of die heads carried by said table, an index frame rotatably mounted, a shaft extending down through the table from the index frame, a series of wire carrying reels supported on said index frame, slides on said frame, one for each reel in position for taking the wire therefrom, and means for operating said slides to move the wire down into the heads.

62. In a swaging machine, the combination of a fixed table, a gear rotatable about the center thereof, a series of gears surrounding said gear and meshing therewith, a cam operated by each of said series of gears, a lever operated by each cam, a conical sleeve mounted to slide vertically and operated by each of said levers, a series of sets of dies, means connected with and operated by each of said sliding sleeves for controlling one of said sets of dies, a longitudinally movable shaft resting on one of said levers and adapted to be operated thereby, and a drill holding chuck on said shaft.

63. In a swaging machine, the combination of a set of dies, means for controlling said set of dies, a longitudinally movable shaft connected with said means and adapted to be operated thereby, and means on said shaft axially alined with said set of dies for operating on one article therein.

64. In a swaging machine, the combination of a head having swaging jaws, a head having a pair of jaws for receiving a blank, a slide movable longitudinally and centrally with respect to said blank and having means for holding a drill in the end thereof, and levers connected with said jaws for operating them, said slide having a cam surface for operating the levers.

65. In a swaging machine, the combination of a head having a pair of jaws for receiving a blank, a slide movable longitudinally and centrally with respect to said blank and having means for holding a drill in the end thereof, means for operating the jaws, a trimming slide movable parallel with the jaws, a lever for operating the trimming slide, a plunger or pin for operating the lever, and a double-faced cam on the slide for engaging said pin or plunger both on the forward and backward movement of the slide, whereby said trimming slide will be operated twice for each complete reciprocation of the plunger.

66. In a swaging machine, the combination of a swaging device, a head, a pair of jaws on the head for receiving a blank, said jaws being movable toward and from each other and having registering recesses in their ends smaller at the receiving side than at the other side, and means for operating said jaws.

67. In a swaging machine, the combination of a swaging device, a head, a pair of jaws thereon for receiving a blank movable toward and from each other and having registering recesses in their ends smaller at the receiving side than at the other side, a trimming knife movable parallel with the jaws on said other side thereof past said recesses, and means for operating said trimming knife.

68. In a swaging machine, the combination of a swaging device, a head, a pair of jaws thereon for receiving a blank movable toward and from each other, a drill shaft movable toward and from said jaws, a trimming knife movable parallel with the jaws on one side thereof, and means for operating said trimming knife twice during each operation of the drill shaft.

69. In a swaging machine, the combination of a stationary plate, a set of stationary heads located under the plate, sets of dies connected with said heads, means on said plate for moving stock down into the dies, and a rotary carrier under said plate for moving the stock from one die head to the next.

70. In a swaging machine, the combination of a stationary plate, a set of stationary heads located under the plate, sets of dies connected with said heads, means on said plate for moving stock down into the dies, a rotary carrier under said plate for moving the stock from one die head to the next, a rotary shaft extending up through the plate, a cylindrical cam on said sleeve or shaft having a cam groove in its outer surface, a cylindrical cam surrounding the first named cam and having a cam groove on its inner surface, and connected rollers entering the two cam grooves, said carrier being connected with the outer cam and operated thereby.

71. In a swaging machine, the combination of a swaging device, a head, a pair of jaws thereon for receiving a blank movable toward and from each other and having registering recesses in their ends smaller at the receiving side than at the other side.

In testimony whereof we have hereunto set our hands, in the presence of two subscribing witnesses.

WARREN E. THOMPSON,
WILLIAM A. LOCKHART.

Witnesses:
 SAMUEL S. SILVA,
 GEO. H. CHAFFIN.

---

Copies of this patent may be obtained for five cents each, by addressing the "Commissioner of Patents, Washington, D. C."